Figure 2:
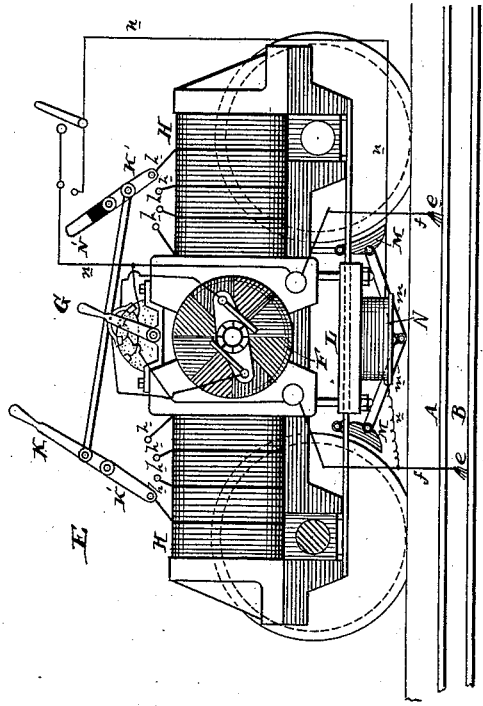
Figure 1:
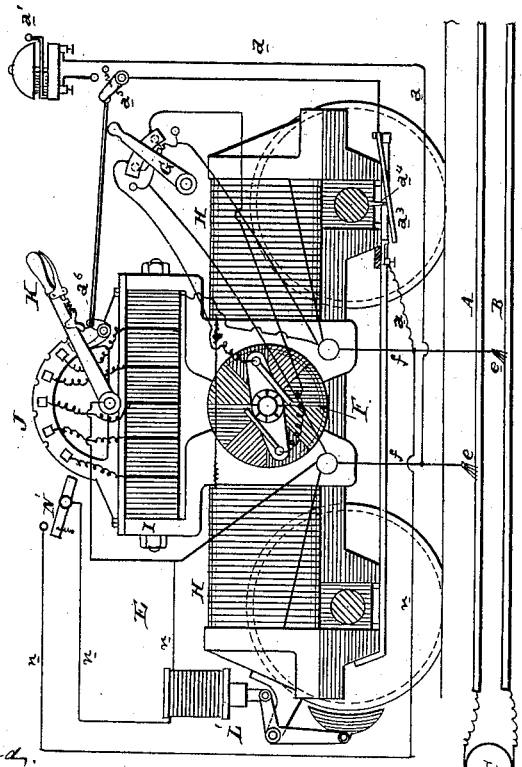

(No Model.)

R. M. HUNTER.
ELECTRIC RAILWAY.

No. 382,876. Patented May 15, 1888.

Attest.
Inventor.

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 382,876, dated May 15, 1888.

Original application filed March 18, 1886, Serial No. 195,742. Divided and this application filed August 29, 1887. Serial No 248,102. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railroads; and it consists in certain improvements, all of which are fully set forth in the following specification, and shown in the accompanying drawing, which forms part thereof.

The object of my invention is to provide means for braking the electric motor; and it consists in increasing the counter electro-motive force of the motor until it increases above the initial electro-motive force, whereby the motor is converted into a generator or dynamo-electric machine, and is driven by the momentum of the car. As the car slows down, the field of force may be increased to keep up the counter electro-motive force as the armature slows down, due to the reducing speed of the motor or train.

In conjunction with the above method of braking the locomotive, an auxiliary friction-brake may be used, which brake would be operated by electricity. This friction-brake would be particularly useful when it is desired to stop the train exactly in front of the station or platform. The counter electro-motive force-braking system is particularly available in slowing down the train, leaving it to the friction-brake to finally stop the train. Either of these devices may be used alone or in combination. It will be observed that the motor when braking the train acts as a generator and supplies electricity to the line-conductors, and this is particularly advantageous, as the extra duty required in going upgrade is practically compensated for in going downgrade, as the extra current utilized is returned to the conductors again and aids the other trains in ascending the grade.

This is a division of my application, Serial No. 195,742, filed March 18, 1886.

In the drawing is shown a sectional elevation of an electric railway with two motors in connection with the working-conductors.

A and B are the line conductors, and, if desired, may be used as working-conductors also.

C is the generator.

E shows the motors, and are electrically connected to the working-conductors by wires $f$ and brushes $e$. The armatures F of the motors are in multiple-arc connection with the field-magnets H, and the currents in the armatures may be reversed by switches G. The field-magnets H may be wound in separate coils connected in series, or the coils may be wound continuous and be tapped, as at $h$, and switches K', operated by handle K, may be used to vary the power of the field-magnets by increasing or decreasing the number of coils in circuit on the cores.

In place of changing the power of the field-magnet, as above described, one or more separate or regulating generator-magnets, I, may be connected with the poles or cores of the field-magnets, and may be traversed by a separate current from that passing through the field, and its magnetic strength may be varied by a switch-lever, K, working with the contacts J in circuit with various portions of the magnets I, so that any desired portion of the coils may be cut out of circuit to decrease the strength of the field, or vice versa. By this means it is seen that if it is desired to stop the train the driver has simply to operate the lever K to increase the field, increasing the counter electro-motive force until it equals the initial electro-motive force. Then the motor will neither act as a motor nor as a dynamo; but now, as the field of force is increased the counter electro-motive force becomes the stronger, and the motor acts as a brake.

L is a friction-brake armature, and may be attracted by the motor-magnets or by auxiliary magnets, if desired, and may be made as a core to work in a helix, as shown at L'. This armature L is connected with the toggle-joint $m$, adapted to actuate the brake-shoes M. To make this brake more powerful I provide the armature with a helix, N, in shunt-circuit $n$ with the motor, and a switch, N', may be used to open or close the circuit $n$ when the brake is to be taken off or put on. When the motor is normally running, the armature L is out of magnetic attraction sufficient to put on the brake; but if the circuit n be closed, it will then be attracted to put on the friction-brake. Again, if the motor is being braked by the counter electro-motive force, the increase of the field will automatically put on the friction-brakes if the increase in the field of force is such as to insure the attraction of the armature L.

It is evident that the brake-armature L may be so designed that, with the greatest increase of the field of the motor, (by increase of the counter electro-motive force,) the attraction may be such that the instant the circuit n is closed the armature L, becoming magnetized, instantly applies the friction-brake to stop the train after the counter electro-motive force has acted to slow it down, thereby enabling the train to be stopped exactly at the right place. The switch N' may be made to operate by the lever K after it has been moved to put on the greatest counter electro-motive force. The cars are also provided with an alarm-gong, $a'$, under the control of the driver by a switch, $a^5$, to notify vehicles and persons on the track, and this gong may be of the kind known as the "striking gong" or a "vibrator." It is placed in a shunt-circuit, $a$, with the motor, which may be opened and closed by the driver alone, or may be intermittently broken by the revolution of the axle of the car or by the motor indirectly. As shown, the shunt is provided with a spring circuit-closer, $a^3$, actuated by a cam or projection, $a^4$, on the axle or rotating shaft. This would have no effect so long as the switch $a^5$ was open; but when closed the alarm will be automatically sounded. This alarm may be automatically put into action upon slowing down the motor by connecting with the switch K' a link-and-lever connection, $a^6$, which may be liberated upon operating the lever K to slow the motor, and thereby allow the switch $a^5$ to close and sound the alarm. In operating normally, or when the motor is traveling at the desired rate of speed, the lever K is thrown to the position indicated in the drawing, and presses upon the bell-crank-lever connection $a^6$ to hold the switch $a^5$ open. If, now, I wish to increase the counter electro-motive force to slow down the motor I move the lever K, and this releases the bell-crank lever, and the switch $a^5$ closes to sound the alarm $a'$. It is readily understood that, if desired, the interrupter $a^3$, or this last-mentioned device for operating the alarm upon slowing down the motor, may be omitted and the alarm wholly controlled by the operator.

Any matters herein set out but not claimed are not dedicated to the public, but form subject-matter of other applications—that is to say, I do not claim the method of braking a train herein set out, nor the construction of the motor with means for varying the number of coils of its field-magnets in circuit, nor the broad application of an electric brake, as those form subject-matter of my applications, Serial Nos. 195,742 of 1886, 200,400 of 1886, and 171,625 of 1885.

Having now described my invention, what I claim as new, and desire to secure by Letters Patent, is—

1. An electric car or motor provided with an armature adapted to be attracted by the poles of the motor, and friction-brake mechanism actuated by said armature, substantially as and for the purpose specified.

2. In an electric car or motor, the field-magnets of the motor and means to increase or decrease their magnetic power, in combination with a brake-applying armature adapted to be attracted to the field-magnet poles upon increasing their strength above the normal to stop the car, substantially as and for the purpose specified.

3. In an electric car or motor, the field-magnet of the motor and means to increase or decrease the magnetic power, in combination with a brake-applying armature adapted to be attracted to the field-magnet poles upon increasing their strength above the normal to stop the car, a helix to magnetize the brake-armature, and a switch to open or close said helix with the electric supply, substantially as and for the purpose specified.

4. In an electric car or motor, the field-magnets of the motor and means to increase or decrease their magnetic power, in combination with a brake applying armature adapted to be attracted to the field-magnet poles upon increasing their strength above the normal to stop the car, a helix to magnetize the brake-armature, and a switch to open or close said helix with the electric supply and put said helix in a shunt around the motor, substantially as and for the purpose specified.

5. In an electric car or motor, the field-magnets of the motor and means to increase or decrease their magnetic power, in combination with a brake-applying armature adapted to be attracted to the field-magnet poles upon increasing their strength above the normal to stop the car, a helix to magnetize the brake-armature, and a switch to put said helix in or out of circuit upon increasing or decreasing the power of the field-magnets, substantially as and for the purpose specified.

6. The combination of the field-magnets H of the motor or car, the magnetic armature L of the friction-brake controlled by said field-magnets, brake-shoes M, actuated thereby, circuit $n$, and a switch to open or close said circuit, substantially as and for the purpose specified.

7. The combination of the field-magnets H of the motor or car made with a series of coils, switches to put any number of said coils into circuit to vary the power of the motor, the magnetic armature L of the friction-brake controlled by said field-magnets, brake-shoes M, actuated thereby, circuit $n$, and a switch to open or close said circuit, substantially as and for the purpose specified.

8. The combination of the field-magnets H of the motor or car made with a series of coils, switches to put any number of said coils into circuit to vary the power of the motor and actuate the switch of the brake-circuit $n$, the magnetic armature L of the friction-brake, shoes M, actuated thereby, circuit $n$, and a switch to open or close said circuit, substantially as and for the purpose specified.

9. An electric-railway motor having its field-magnets formed of a series of coils, those on each magnet connected in series, in combination with an electric circuit for supplying electricity to said magnets, and switches to simultaneously put in or out of circuit any number of coils of each field-magnet to vary the power or speed of the motor, substantially as and for the purpose specified, an electric signal, a signal-circuit, a switch in said circuit, and a connection between the signal-switch and switches for putting in or out of circuit the magnet-coils of the field-magnets.

10. An electric-railway motor having its field-magnets formed of a series of coils, and its armature arranged in multiple-arc or shunt connection with said field-magnets, in combination with working-conductors and connecting devices for supplying electricity to said magnets, and switches to simultaneously put in or out of circuit any number of coils of each field-magnet to vary the power or speed of the motor, and switch devices for reversing the direction of the current through the armature, substantially as and for the purpose specified, an electric signal, a signal-circuit, a switch in said circuit, and a connection between the signal-switch and switches for putting in or out of circuit the magnet-coils of the field-magnets.

11. In an electric railway, the working-conductors, in combination with a motor or car, connecting devices for conveying electric currents to the motor from the conductors, a slowing-down lever to control the power of the motor, an alarm or electric bell arranged in a branch circuit connecting the positive and negative working-conductors and interrupted to intermittently break said branch circuit, a switch to open or close said circuit, and a connection between said switch and slowing-down lever, substantially as and for the purpose specified.

12. In an electric railway, the working-conductors, in combination with a motor or car, connecting devices for conveying electric current to the motor from the conductors, a slowing-down lever to control the power of the motor, an alarm or electric bell arranged in a branch circuit connecting the positive and negative working-conductors, and a switch to open or close said circuit actuated by the slowing-down lever to sound the alarm when slowing down the motor, substantially as and for the purpose specified.

13. In an electric railway, a traveling electric vehicle, an electric motor on said vehicle, a source of electric energy, an electric brake, a brake-magnet having its coils made in sections, a brake-circuit including said magnet, switch devices to put one or more of said coils in circuit, a brake-armature, a helix on said armature, and an electric circuit to energize said armature, substantially as and for the purpose specified.

14. In an electric railway, a traveling vehicle, a source of electric energy, a mechanical or friction brake, a movable brake-actuating magnet, a stationary magnet independent of the wheels to actuate said brake-magnet, a connection between the brake-magnet and friction-brake, and means to energize the said movable brake-magnet, whereby it is attracted toward the stationary magnet.

15. In an electric railway, a traveling electric vehicle, an electric motor on said vehicle, a source of electric energy, an electric brake, a brake-magnet connected to the brake and capable of moving a stationary magnet, and means to energize both said movable and stationary magnets, substantially as and for the purpose specified.

16. In an electric railway, a traveling electric vehicle, an electric motor on said vehicle, a source of electric energy, an electric brake, a brake-magnet connected to the brake and capable of moving a stationary magnet, and means to energize both of said movable and stationary magnets, and means to vary the power of the stationary magnet, substantially as and for the purpose specified.

17. In an electric railway, a line-working conductor, a traveling electrically-propelled vehicle, an electric motor on said car receiving electric current from said conductor, the field-magnets of said motor being formed of a number of coils or helices, and means for putting into or out of circuit one or more of said helices to vary the power of the field-magnets, an alarm or signal, a signal-circuit, a switch in said signal-circuit, and a connection between said signal-switch and the means for putting into or out of circuit the helices of the field-magnets.

18. In an electric railway, a line-working conductor, a traveling electrically-propelled vehicle, an electric motor on said car receiving electric current from said conductor, the field-magnets of said motor being formed of a number of coils or helices, means for putting into or out of circuit one or more of said helices to vary the power of the field-magnets, and means for reversing the current in the armature-circuit, an alarm or signal, a signal-circuit, a switch in said signal-circuit, and a connection between said signal-switch and the means for putting into or out of circuit the helices of the field-magnets.

In testimony of which invention I hereunto set my hand.

RUDOLPH M. HUNTER.

Witnesses:
RICHD. S. CHILD, Jr.,
E. M. BRECKINREED.